Figure 3:
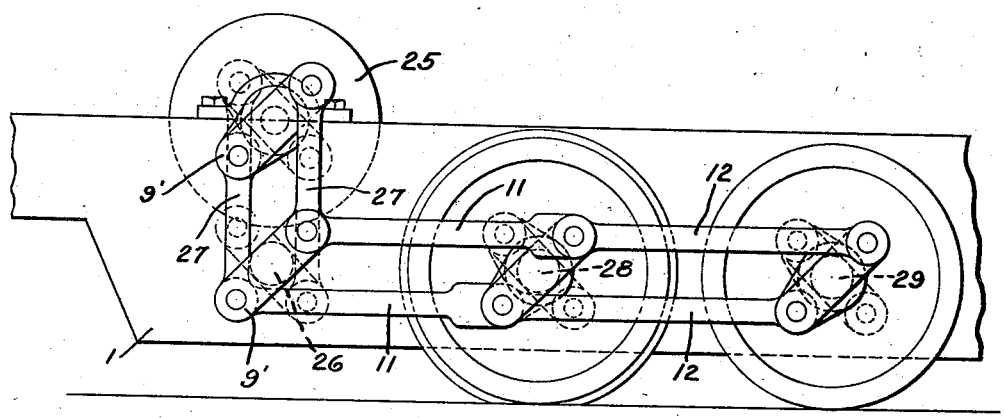

March 15, 1927.
E. A. SLATER
1,621,033
DRIVE MECHANISM
Filed Dec. 20, 1923
4 Sheets-Sheet 1
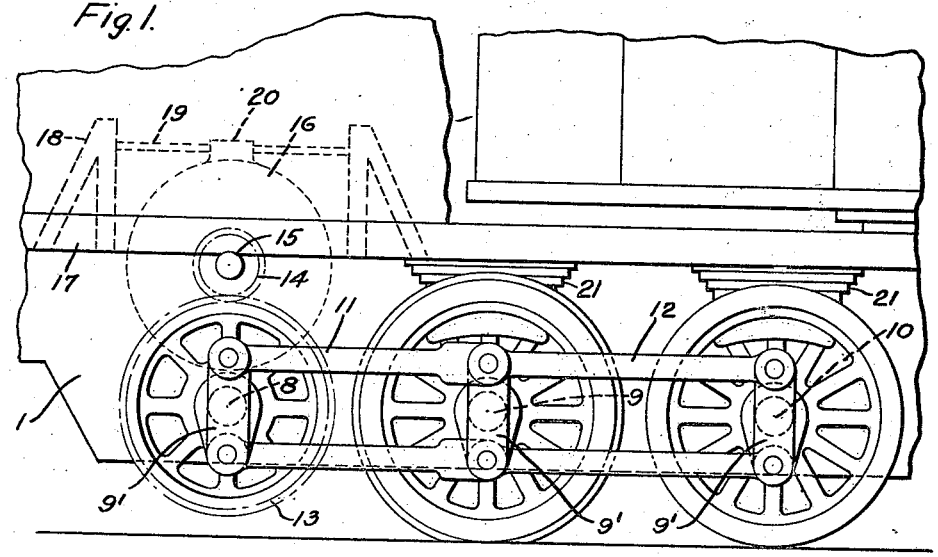
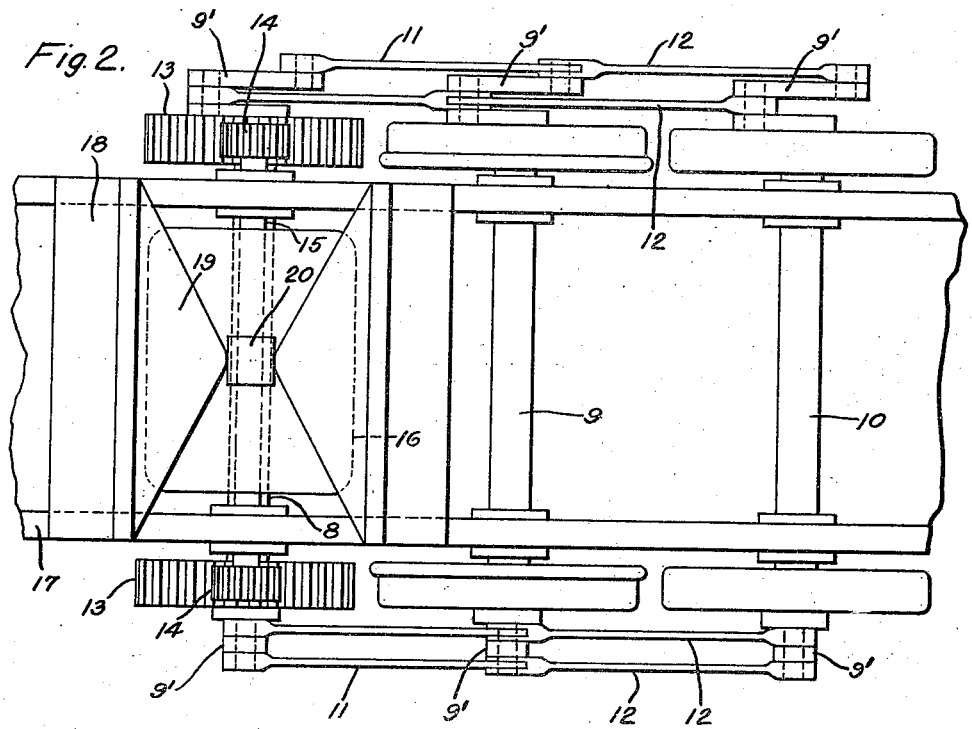
WITNESSES:
S. H. Volker.
W. B. Jaspert.
INVENTOR
Earl A. Slater.
BY
Wesley G. Carr
ATTORNEY March 15, 1927.

E. A. SLATER 1,621,033

DRIVE MECHANISM

Filed Dec. 20, 1923

4 Sheets-Sheet 2

WITNESSES:

INVENTOR
Earl A. Slater.
BY
ATTORNEY

March 15, 1927.　　　E. A. SLATER　　　1,621,033

DRIVE MECHANISM

Filed Dec. 20, 1923　　　4 Sheets-Sheet 3

WITNESSES:

INVENTOR
Earl A. Slater.
BY
ATTORNEY

March 15, 1927.  E. A. SLATER  1,621,033

DRIVE MECHANISM

Filed Dec. 20, 1923.  4 Sheets-Sheet 4

WITNESSES:
S. H. Volker
M. B. Jaspert

INVENTOR
Earl A. Slater.
BY
Wesley G. Carr
ATTORNEY

Patented Mar. 15, 1927.

1,621,033

UNITED STATES PATENT OFFICE.

EARL A. SLATER, OF WILKINSBURG, PENNSYLVANIA, ASSIGNOR TO WESTINGHOUSE ELECTRIC & MANUFACTURING COMPANY, A CORPORATION OF PENNSYLVANIA.

DRIVE MECHANISM.

Application filed December 20, 1923. Serial No. 681,787.

My invention relates to drive mechanisms for the transmission of power or changing the direction of the forces of co-operating drive members, more especially to a connecting rod drive of an improved type.

It is among the objects of my invention to provide an improved drive mechanism of the connecting rod type for transmitting power between a plurality of rotating members such as a prime mover and a driven member or a plurality of driven and intermediate members.

It is a further object of my invention to provide a drive mechanism of the above-designated character which shall be designed to balance the forces and resultant stresses acting through the connecting rod members and the crank pins on the associated journals or bearing supports.

It is still a further object of my invention to provide a drive mechanism of the above-indicated type which shall be applicable to a variety of uses, such as for the locomotion of electrically or steam driven ships and railway vehicles, in which it may be substituted for the connecting rod system now in common use; and it may be applied to balance any machine drive tending to producing impulses in the journals, to thereby obtain a smoothly running drive.

In my copending application Serial No. 661,541, filed September 8, 1923, I have described a connecting rod drive mechanism associated with an electrical motor for a stern-wheel boat drive, for which the drive mechanism constituting my present invention may readily be substituted to advantage, and although my present device is somewhat analogous to the drive mechanism described therein, yet it is distinctly different in that the balanced connecting rods as disclosed herein produce the effect of a floating jack shaft which, to a great extent, eliminates the bearing troubles and difficulties encountered in prior designs.

My improved type of connecting rod drive is especially applicable to railway vehicles of the electrically-driven or steam-propelled side-rod type in that it eliminates most of the counterbalance weights on the drive wheels and by means of double rods acting as couples, balances the stresses on the rotating members. The jack-shafts of railway locomotives of former types require a bulky design, in excess of the size of parts necessary for the torque transmission requirements, to take care of the bending stresses to which they are subjected.

By utilizing my double connecting rod drive the jack-shaft becomes practically a floating member, in which bending stresses, to which it was subjected in the above-mentioned designs, are very much reduced by reason of the action of the double rods. The jack-shaft, as constituted in my improved form of drive, may be reduced in size to a structure that is merely capable of carrying the loads represented by the driving torque and the reduced bending force, as the forces constituting the couple exerted by the rods tend to neutralize each other.

As the function of this mechanism is best illustrated by a practical application thereof, I have chosen the attached illustration of vehicle drive mechanisms as typical of the principle embodied in my invention.

Figure 4:
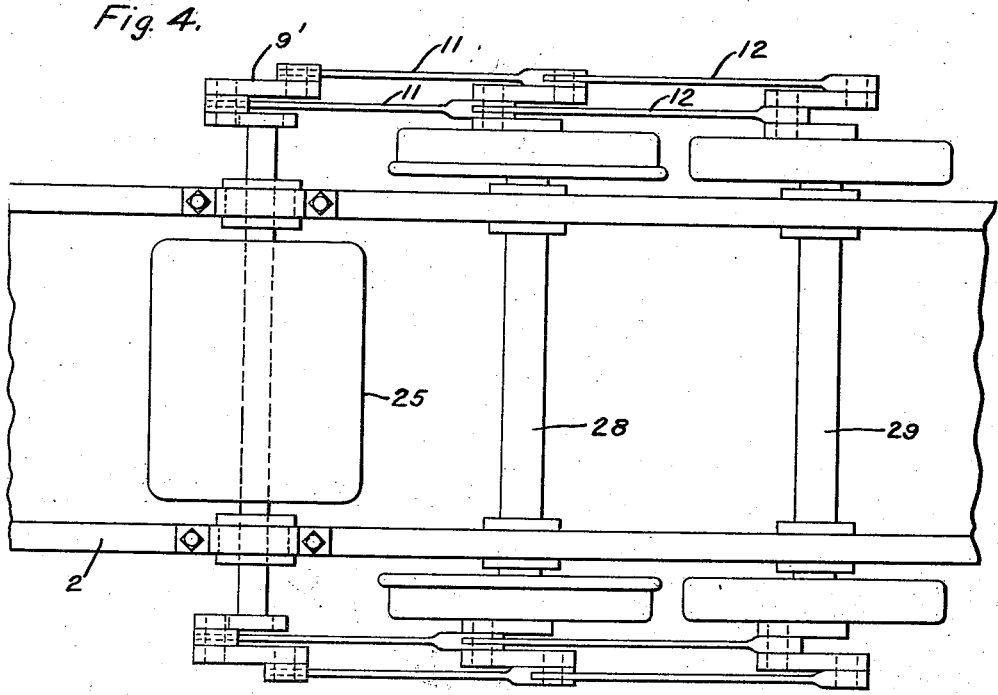
Figure 5:
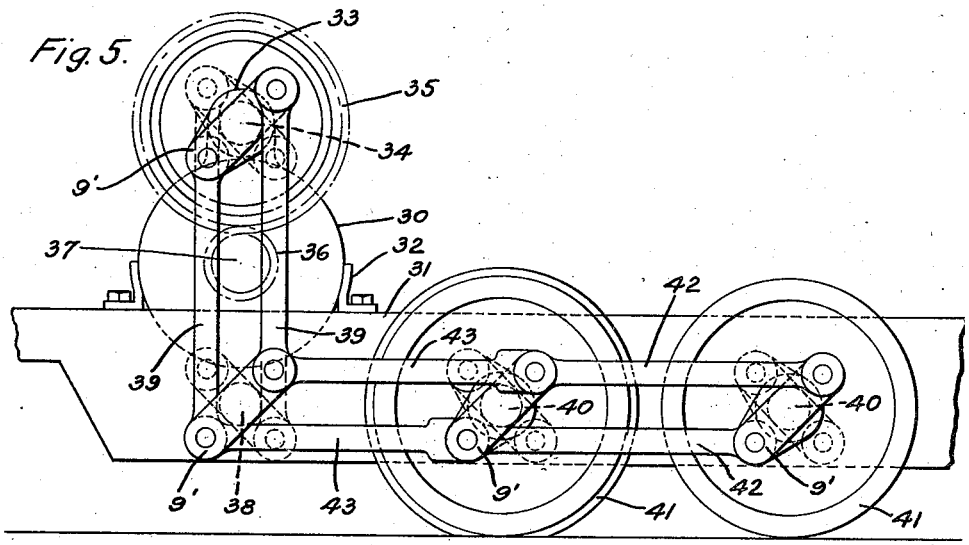
Figure 6:
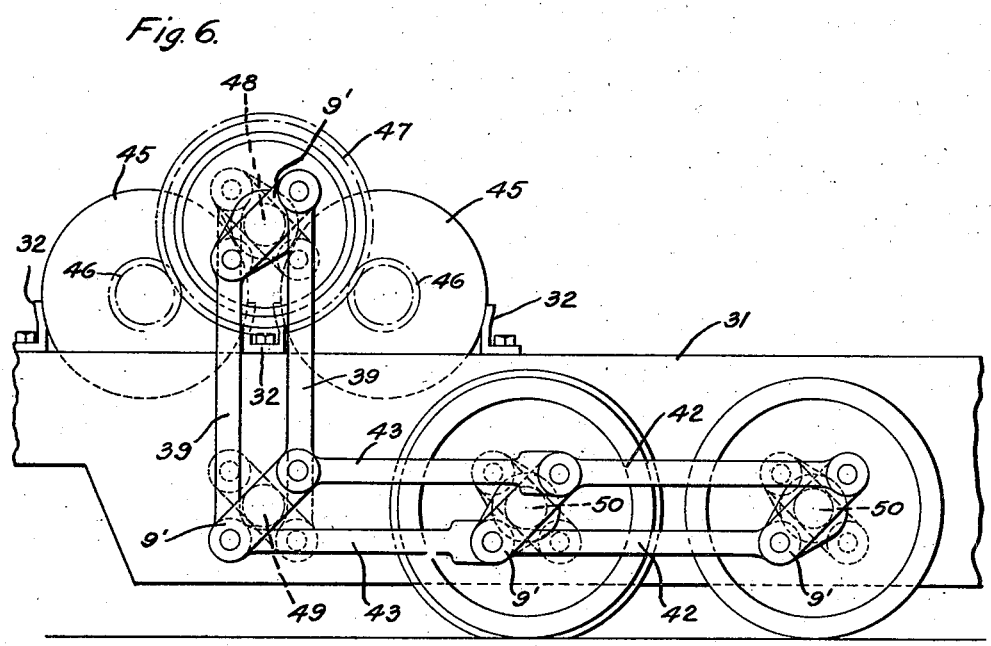
Figure 7:
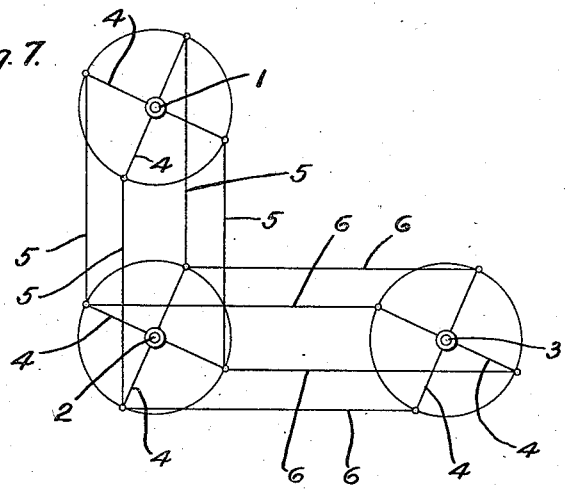
Figure 8:
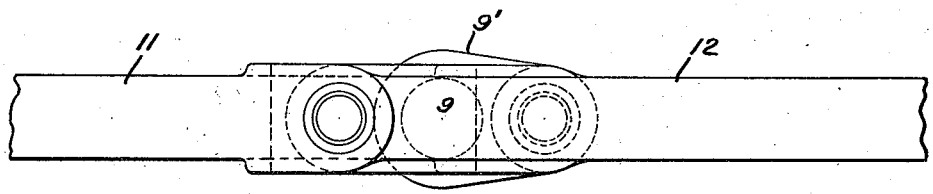
Figure 9:
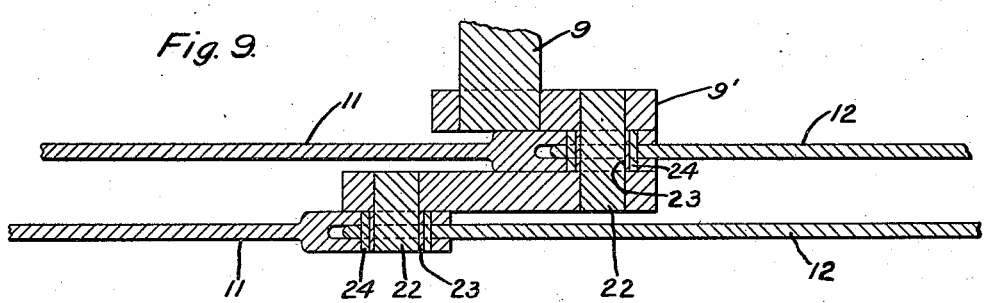

In the accompanying drawings constituting a part hereof and in which like reference characters designate like parts;

Fig. 1 is a side elevational view of a fragmentary portion of an electrically driven railway vehicle embodying my invention, Fig. 2 is a corresponding plan view thereof, Fig. 3 is an elevational view illustrating another embodiment of my invention, Fig. 4 is a plan view corresponding to Fig. 3, Fig. 5 is an elevational view of a further modification of the connecting rod drive mechanism, Fig. 6 is a similar view of still another modification thereof, Fig. 7 is a diagrammatic view illustrating the connections and functioning of the drive rod mechanism and serving to indicate the direction of forces exerted by and acting upon the rods and bearing members, Fig. 8 is a side elevational view of a connecting-rod joint embodying a double crank connection and employed in my invention, and Fig. 9 is a longitudinal cross-sectional view thereof.

Referring first to the diagrammatic view of Fig. 7, the small circles 1, 2 and 3 respectively designate the axes of a driving member and a plurality of driven members. The sets of right-angle or cross lines 4 represent crank arms, while the vertical lines 5 and horizontal lines 6 represent the respective connecting rods for coupling the crank arms 4.

The axis 1 represents a driving member, such as an armature shaft of a dynamo-electric machine, 2 an intermediate or jack-shaft member and 3 the axle of a pair of driving wheels. From the angular position of the respective axes, it will be noted that the driving motor is mounted vertically of the driven members.

Assuming a clock-wise direction of rotation of the crank arms 4 of the axis 1, the connecting rods 5 on the right-hand side of the vertical center line are in compression and those on the left hand side in tension to respectively transmit torque to the crank arms of the axis 2 to actuate said arms in a clock-wise direction. The rods 6 above the horizontal center line of the axis 2 and 3 are likewise in compression and the rods 6 below the horizontal line in tension to transmit torque to the arms 4, rotatable about the axis 3. The resultant of forces about the axis 2 is substantially zero, by reason of the couples produced by the use of the double rods. The jack-shaft 2 is, therefore, a floating member functioning simply as an intermediate member to change the direction of the driving force.

Applying this principle to a practical vehicle drive mechanism such as illustrated in Fig. 1, the axes 1, 2 and 3 of Fig. 7 are represented by the jack-shaft 8 and the two drive axles 9 and 10, respectively. The crank arms 9' on the shaft 8 are equivalent to the arms 4 of Fig. 7, as are the crank arms 9' of the axles 9 and 10, one set of arms being on each end of the axles and shafts, as clearly shown in Fig. 2. The drive rods 11 and 12 are the equivalents of the lines 5 and 6, respectively, in Fig. 7, and the mechanism is actuated by a gear-wheel 13 and pinion 14, at each end of a motor 16, each gear-wheel being mounted on the jack-shaft 8 and each pinion member 14 on the shaft 15 of the driving motor 16. The motor 16 is mounted on the sub-frame 17 of the vehicle by means of vertical brackets 18 having longitudinally extending arms 19 engaging a lug 20 of the motor frame to permit oscillatory movement thereof.

The jack-shaft 8 is journalled in a bearing constituting a unitary part of the vehicle frame 1 and the vehicle body is carried by suitable drive springs 21, which are mounted on the wheel axles 9 and 10, respectively. The drive mechanism is the same structurally on both sides of the vehicle, being suitably arranged in quartering relation on the respective sides, to constitute a balanced drive, as shown in Fig. 2.

The jack-shaft 8 is mounted in the vehicle frame 1 in a manner to permit lateral displacement thereof, that is, in a longitudinal direction with respect to the frame, but it is restricted against vertical displacement.

The crank pin and the connecting rods may be constructed as illustrated in Figs. 8 and 9, in which the reference character 9 indicates the axle 9, of Fig. 1, and 9' the crank arms 4. The crank pins 22 are provided with wearing liners 23 and with bushings 24 that are inserted in the connecting rods 11 and 12. The rod 11 is forked to receive the rod 12 as shown.

In Fig. 3 and Fig. 4, the drive embodies a motor 25 having the quartered crank arms 9' mounted on the ends of its armature shaft, the arms on each side being connected to the jack-shaft 26 by a double pair of short rods 27, and the jack-shaft 26 is similarly joined to an axle 28, for example, or to a pair of drive axles 28 and 29, respectively.

In Fig. 5, a drive motor 30 is secured to side frames 31 by a plurality of brackets 32, and the upper portion of the motor frame is provided with a bearing housing 33 that may be adapted to rotatably mount a jack-shaft 34. The jack-shaft is adapted to carry gear-wheels 35 on its respective ends that are in co-operative engagement with pinion members 36, mounted on the ends of the motor shaft 37. Another jack-shaft 38 may be journalled below the motor 30 in substantially the same plane as the motor shaft 37 and the jack-shaft 34. The shafts 34 and 38 are respectively provided with crank arms 9' which are joined by connecting rods 39. A pair of drive axles 40, carrying wheels 41, are journalled in the side frames 31 in the usual manner, in a plane horizontal with respect to the axis of the jack-shaft 38. The axles 40 are provided with crank arms 9' and are respectively joined by connecting rods 42 and 43 to the jack-shaft 38.

Fig. 6 illustrates a similar arrangement embodying a pair of motors 45 having pinions 46 in engagement with gear-wheels 47 mounted on the respective ends of a jack-shaft 48. The lower jack-shaft 49 and the wheel axles 50 are disposed similarly to the combination shown in Fig. 5; likewise, the crank arms and connecting rods are connected and function as described above.

It is evident from the foregoing description of my invention that my double connecting rod drive mechanism provides a balanced drive which eliminates the necessity of counter-balance weights and the like that were embodied in prior devices to balance the connecting rods, and that the respective rods and crank members co-ordinate to balance the forces exerted on the rotating members so as to greatly reduce the stresses and destructive effects heretofore encountered. Although I have illustrated my invention as embodied in vehicle propulsion mechanism, it is evident that it need not be restricted to such use but may be embodied in any type of drive unit comprising a number of similarly co-ordinating axles, or the like.

Furthermore, although I have described a specific embodiment of my invention it will be obvious to those skilled in the art that various modifications may be made in the design, details and proportions of the several parts without departing from the principles herein set forth.

I claim as my invention:—

1. A vehicle-drive mechanism comprising a plurality of wheeled axles journalled to rotate with their axes in substantially parallel relation, and a plurality of rods, said axles being adapted to be cooperatively associated by means of said rods respectively connecting the corresponding ends of said axles and a jack shaft operatively connected to one of said axles, said axles and jack shaft being in balanced relation.

2. A vehicle-drive mechanism comprising a plurality of journalled wheel axles having their respective ends provided with double cranks, one or more jack-shafts associated therewith and connecting rods pivotally mounted on the crank pins of said axles and operatively engaged with said shafts, said axles, crank shafts and rods being in such cooperative relation as to constitute a substantially balanced drive unit.

3. A drive mechanism comprising a drive shaft, a jack-shaft, a plurality of driven axles having double crank arms at their respective ends and connecting rods joining said crank arms, the rods connecting the axles being at right angles to the jack-shaft, and all of the said rods and cranks being arranged to constitute said jack-shaft a substantially floating member.

4. The combination with a plurality of driven axles having double crank arms at their respective ends, of a pair of jack-shafts, connecting rods co-operatively engaging said shafts and axles, and a drive shaft geared to one of said jack-shafts.

5. The combination with a plurality of driven axles having double crank arms at their respective ends, of a pair of jack-shafts, connecting rods cooperatively engaging said jack-shafts and axles, and a plurality of drive shafts geared to one of said jack-shafts, one of said jack-shafts constituting a floating couple.

In testimony whereof, I have hereunto subscribed my name this 27th day of November, 1923.

EARL A. SLATER.